United States Patent
Yamada et al.

(10) Patent No.: US 9,965,620 B2
(45) Date of Patent: May 8, 2018

(54) APPLICATION PROGRAM INTERFACE (API) MONITORING BYPASS

(71) Applicant: Intel Corporation, Santa Clara, CA (US)

(72) Inventors: Koichi Yamada, Los Gatos, CA (US); Palanivelrajan Shanmugavelayutham, San Jose, CA (US); Chang Seok Bae, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 164 days.

(21) Appl. No.: 14/998,257

(22) Filed: Dec. 24, 2015

(65) Prior Publication Data

US 2017/0185791 A1    Jun. 29, 2017

(51) Int. Cl.
*G06F 21/00* (2013.01)
*G06F 21/52* (2013.01)

(52) U.S. Cl.
CPC ................................. *G06F 21/52* (2013.01)

(58) Field of Classification Search
None
See application file for complete search history.

(56) References Cited

U.S. PATENT DOCUMENTS

| | | | | |
|---|---|---|---|---|
| 2009/0044274 A1* | 2/2009 | Budko | ................... | G06F 21/53 726/24 |
| 2010/0161875 A1* | 6/2010 | Chang | ................. | G06F 12/1036 711/6 |

FOREIGN PATENT DOCUMENTS

| | | |
|---|---|---|
| WO | 2014189510 A1 | 11/2014 |
| WO | 2015030748 A1 | 3/2015 |

OTHER PUBLICATIONS

Hunt, et al.; "Detours: Binary Interception of Win32 Functions"; Microsoft Research; http://research.microsoft.com/sn/detours; USENIX; Jul. 1999; 9 pages.
Dabbadoo; "EMET 4.1 Uncovered"; 0xdabbad00.com; Nov. 18, 2013; 18 pages.
DeMott, Jared; "Bypassing EMET 4.1"; Br Labs; Feb. 24, 2014; 19 pages.

* cited by examiner

*Primary Examiner* — David Le
(74) *Attorney, Agent, or Firm* — Grossman, Tucker, Perreault & Pfleger, PLLC (57) ABSTRACT

This disclosure is directed to a system for system for application program interface (API) monitoring bypass prevention. Operation of an API function may be preserved by generating a binary translation based on the API function native code. The native code may then be protected to prevent API monitoring bypassing. In one embodiment, access permission may be set to non-executable for a memory page in which the native code is stored. Attempts to execute the native code may generate exceptions triggering API monitoring. Alternatively, some or all of a body section of the native code may be replaced with at least one trap instruction that cause exceptions triggering API monitoring or engaging protective measures. Use of the trap instruction may be combined with at least one jump instruction added after a header section of the native code. Execution of the jump instruction may cause execution to be redirected to API monitoring.

25 Claims, 4 Drawing Sheets

APPLICATION PROGRAM INTERFACE (API) MONITORING BYPASS

TECHNICAL FIELD

The present disclosure relates to device security, and more particularly, to a system that may catch malicious code attempting to bypass application program interface (API) monitoring.

BACKGROUND

As new technologies continue to emerge, the reliance on these technologies to perform a variety of transactions continues to grow. A user may rely on one or more devices (e.g., smart phone, tablet computer, laptop computer, desktop computer, etc.) to perform various tasks such as, for example, communicating (e.g., email, messaging, social media, videoconferencing, etc.), account accessing, financial transactions, commercial transactions, positioning (e.g., navigation, location determination, etc.), etc. The data required to perform these various task may include, for example, personal identification (ID) information, home or professional address information, account ID information, account passwords, contact information, personal images and/or videos, etc. The availability of this type of data in a centralized location may be attractive to those who may have malicious and/or unlawful intent. Thus, a hacker may attack a device directly and/or may generate malicious software (e.g., malware) to surreptitiously attack the device to get access to personal and/or confidential data in the device, or even to take remote control over the device.

To combat the threat, equipment and software developers continue to try to develop more impregnable protective measures. However, hackers have proved to be adept at circumventing defenses soon after they are released. For example, an application program interface (API) may include a set of standard program characteristics (e.g., routines, protocols, tools, etc.) that other applications may use when interacting with the program. While this standardization may make is easier to design programs that work together, hackers have also figured out that a device may be made to operate in an unexpected manner by altering API calls to change how programs are called, which programs are called, etc. As a result, security solution providers have built checks into software that may redirect API calls to an inspection engine to determine if the calls are legitimate (e.g., to cause intended program execution). Calls that are determined to be legitimate may be allowed to proceed, and calls that are questionable may cause the device to engage protective measures to avoid being compromised. However, even as this protection is incorporated into new devices, hackers are developing new ways to bypass these API inspection redirects to avoid detection.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

This disclosure is directed to a system for system for API monitoring bypass prevention. Operation of an API function may be preserved by generating a binary translation (BT) based on native code of the API function, and the native code may then be protected to prevent monitoring of the API function from being bypassed. The native code may be protected in a variety of ways. In at least one embodiment, access permission may be changed for a memory page in which the native code is stored. The access permission may be changed to, for example, non-executable so that an exception is generated triggering API monitoring whenever an attempt is made to execute the native code. In a different embodiment, some or all of a body section of the native code may be replaced with at least one trap instruction to generate an exception. Executing code upon entry into the body section may redirect to API monitoring. However, if an attacker attempts to avoid API monitoring by executing code within the body section, executing the trap instruction will cause an exception to be generated that may engage protective measures in the device. The use of trap instructions in the body section may be combined with at least one jump instruction added following a header section of the native code to redirect execution to API monitoring (e.g., during normal operation) to, for example, avoid using exceptions during normal operation. API monitoring may include, for example, determining if at least one program call generated by the API function is legitimate, safe, expected, etc. If the at least one program call is determined to be legitimate, then the BT version of the original native code may be executed. A determination that the at least one program call is illegitimate may engage protective measures in the device.

In at least one embodiment, a device equipped with API monitoring bypass prevention may comprise at least processing circuitry, memory circuitry and BT circuitry. The processing circuitry may be to execute at least one thread. The memory circuitry may be to store native code and a BT corresponding to the native code. The BT circuitry may generate the BT based on the native code, protect the native code to prevent a bypass of API monitoring and perform API monitoring.

In at least one embodiment, in generating the BT, the BT circuitry may be to determine at least one section of the native code for API monitoring and prepare the at least one section of the native code for BT generation. In protecting the native code, the BT circuitry may be to alter an access permission of at least one code page in the memory circuitry in which the native code is stored. For example, the BT circuitry may be to set the access permission of the at least one code page to non-executable. In performing API monitoring, the BT circuitry may be to inspect a program call made by the at least one thread when an exception is generated by the at least one thread attempting to execute the native code in the at least one non-executable code page.

In the same or a different embodiment, the native code may comprise at least a body section and in protecting the native code the BT circuitry may be to replace at least a portion of the body section with at least one trap instruction to trigger an exception. In this embodiment the device may comprise security circuitry and in performing API monitoring the binary translation circuitry is to redirect code execution to API monitoring when an exception is generated by the at least one thread executing a trap instruction upon entry into the body section and cause the security circuitry to engage protective measures when an exception is generated by the at least one thread executing a trap instruction from within the body section. The native code may further comprise at least a header section and in protecting the native code the BT circuitry may be to insert into the native code at least one jump instruction following the header section to redirect code execution to API monitoring. In performing API monitoring the BT circuitry may be to inspect at least one program call made by the at least one thread when an exception is generated by the at least one thread executing the at least one jump instruction.

In the same or a different embodiment, in performing API monitoring the BT circuitry may be to inspect at least one program call made by the at least one thread and execute the BT of the native code based on the at least one program call passing the inspection. Alternatively, the BT circuitry may be to cause the security circuitry to engage protective measures based on the program call not passing the inspection. Consistent with the present disclosure, a method for API monitoring bypass prevention may comprise, for example, determining at least one section of native code to be subjected to API monitoring in a device, wherein the native code is stored in memory circuitry within the device, preparing the at least one section of native code for BT, generating a BT of the at least one section of the native code, storing the BT in at least one translation page in the memory circuitry, protecting the native code to prevent a bypass of API monitoring and performing API monitoring.

Figure 1:
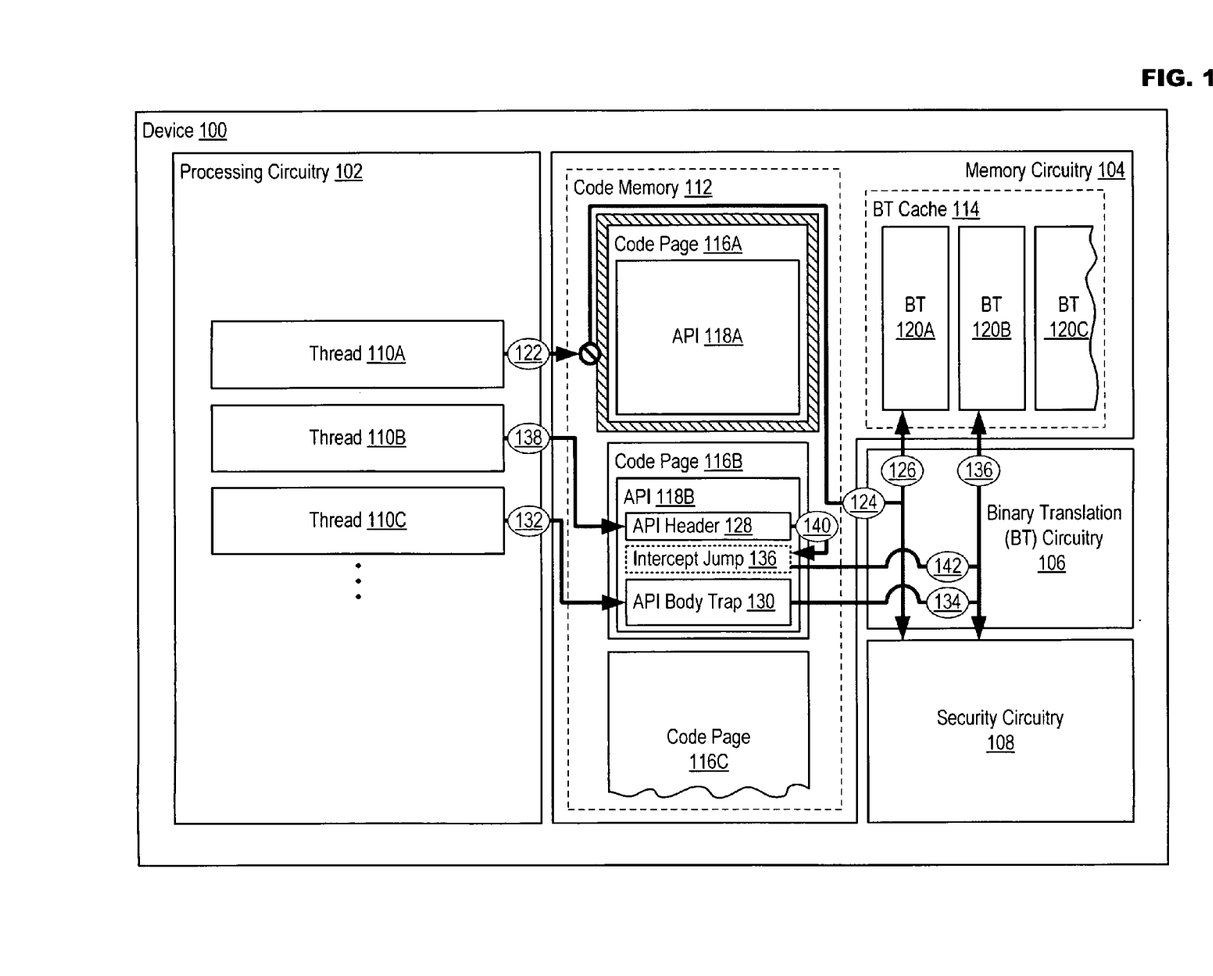
FIG. 1 illustrates an example device comprising API monitoring bypass prevention in accordance with at least one embodiment of the present disclosure.

FIG. 1 illustrates an example device comprising API monitoring bypass prevention in accordance with at least one embodiment of the present disclosure. Initially, the following may make reference to, or may use terminology commonly associated with, certain technologies for implementing access permissions on memory pages in a device to limit access to the contents of memory pages to only certain operations (e.g., read, write and/or execute). Access permissions may be implemented using paging and page table memory management functionality commonly present in microprocessors, hardware-enforced security features such as, for example, extended page table (EPT) functionality present in the certain microprocessors comprising virtualization technology (e.g., VT-x technology such as offered in microprocessors manufactured by the Intel Corporation). In another embodiment, a software-driven management system (e.g., NTDLL.dll in Windows operating systems from the Microsoft Corporation) may be employed to implement access permissions. These examples are offered merely for the sake of explanation, and are not intended to limit embodiments consistent with the present disclosure to any particular manner of implementation. While these technologies provide a basis for understanding the embodiments, actual implementations may utilize other technologies existing now or developed in the future.

As referenced herein, BT is a technique that may be employed to achieve instruction set architecture (ISA) compatibility of a binary without recompiling, increased performance through dynamic optimization, enforcement of security policy during execution, etc. A binary translator may generate translations from native code (e.g., a programming language used by a programmer to construct a program) and execute these translations instead of the native code. Otherwise the native code would need to be interpreted (e.g., translated line-by-line during execution), which may slow down the speed of data processing. While in some instances (e.g., such as in dynamic optimization) BT may increase the performance of an application, it is important for BT systems to remain faithful to how the original program was designed to execute. Therefore, BT systems strive to produce the same output as the native code. Translating native code into binary may also slow down system performance, so if native code may be executed more than once it may be beneficial to store a copy of the binary translation in a translation memory or "cache" so that the binary may be executed repeatedly without having to translate the native code each time.

An example device 100 is disclosed in FIG. 1. Device 100 may generally be an apparatus comprising resources to at least receive data, process the data and generate an output. Examples of device 100 may include, but are not limited to, a mobile communication device such as a cellular handset or a smartphone based on the Android® OS from the Google Corporation, iOS® or Mac OS® from the Apple Corporation, Windows® OS from the Microsoft Corporation, Tizen® OS from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle® from the Amazon Corporation, etc., an Ultrabook® including a low-power chipset from the Intel Corporation, a netbook, a notebook, a laptop, a palmtop, etc., a wearable device such as a wristwatch form factor computing device like the Galaxy Gear® from Samsung, an eyewear form factor computing device/user interface like Google Glass® from the Google Corporation, a virtual reality (VR) headset device like the Gear VR® from the Samsung Corporation, the Oculus Rift® from the Oculus VR Corporation, etc., a typically stationary computing device such as a desktop computer, server, a group of computing devices in a high performance computing (HPC) architecture, a smart television or other "smart" device, small form factor computing solutions (e.g., for space-limited applications, TV set-top boxes, etc.) like the Next Unit of Computing (NUC) platform from the Intel Corporation, etc.

Figure 2:
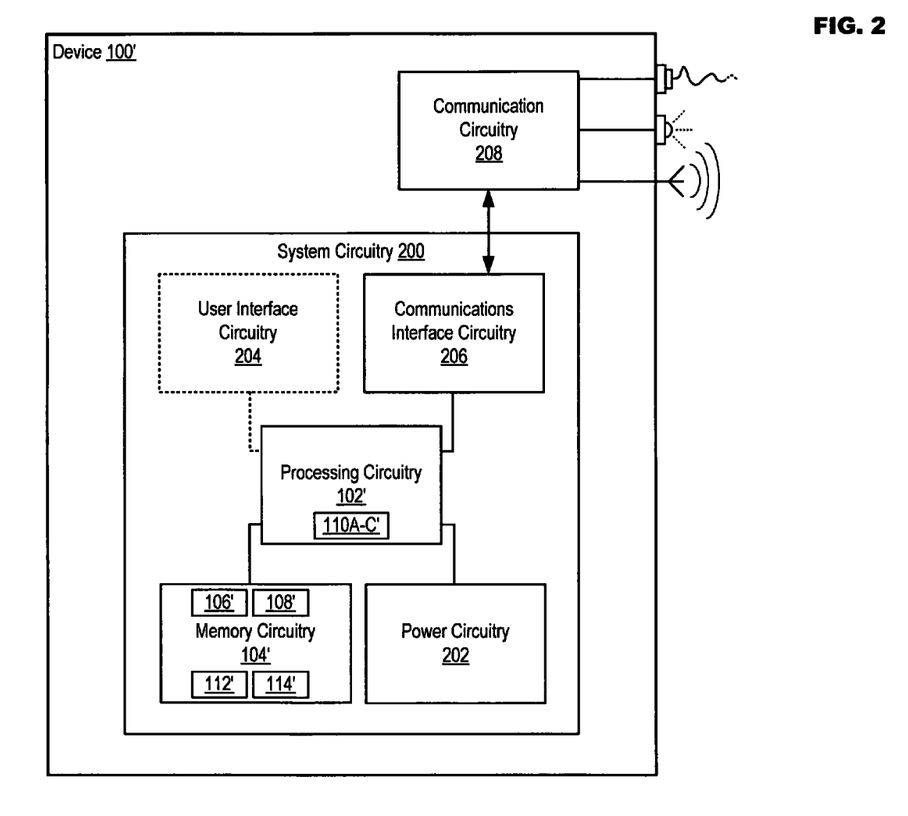
FIG. 2 illustrates an example configuration for a device usable in accordance with at least one embodiment of the present disclosure.

Device 100 may comprise, for example, processing circuitry 102, memory circuitry 104, BT circuitry 106 and security circuitry 108. An example implementation of circuitry 102 to 108, as well as other circuitry that may exist in device 100, is shown in FIG. 2. Processing circuitry 102 may execute thread 110A, thread 110B and thread 110C (collectively, "threads 110A . . . C"). While only three threads 110A . . . C are illustrated, the actual number of threads may depend on a variety of factors such as, for example, the number of processing cores in processing circuitry 102, the number of processing cores that are active at any given time, the currently processing load of device 100, etc. Threads 110A . . . C, as referenced herein, may comprise sequences of programmatic instructions that may result in interaction with other resources in device 100 such as memory circuitry 104. In this regard, threads 110A . . . C may share these resources such as memory and data in memory circuitry 104. At least one thread (e.g., 110A) may be launched in processing circuitry 102 when, for example, device 100 is initiated, a user of device 100 causes an application to be loaded, etc.

Example memory circuitry 104 may comprise at least code memory 112 and BT cache 114. In general, code memory 112 and BT cache 114 may reside in the same physical memory or separate physical memories configured to store data temporarily while device 100 is active. Code memory 112 may comprise at least one memory page, and in example illustrated in FIG. 1 comprises at least code page 116A, code page 116B and code page 116C (collectively, "code pages 116A . . . C"). The number of code pages in code memory 112 may depend on a variety of parameters such as memory size, the applications loaded in device 100, the applications active in device 100, etc. Code pages 116A . . . C may comprise segments of native code that may, alone or in combination, form the basis for software in device 100 such as, for example, OS components, applications, programs, services, utilities, drivers, etc. BT cache 114 may comprise various BTs corresponding to each of code pages 116A . . . C, including, for example, BT 120A, BT 120B and BT 120C (collectively, "BT pages 120A . . . C). BT 120A may correspond to code page 116A, BT 120B may correspond to code page 116B and BT 120C may correspond to code page 116C.

BT circuitry 106 may include, for example, a binary translator to generate BT 120A . . . C based on code pages 116A . . . C, analysis resources to analyze data and control resources to cause activities to occur in device 100. For example, BT circuitry 106 may receive redirects from the execution of code in code pages 116A . . . C, determine if program calls being made by the code are legitimate (e.g., safe, expected, non-malicious, etc.), execute a corresponding BT 120 A . . . C if the program calls are determined to be legitimate or engage protective measures if at least one of the program calls is determined to be illegitimate. Security circuitry 108 may include various resources that may be engaged to protect device 100 from being compromised by an attack from a hacker, malware etc. Example activities that may occur when security circuitry 108 is engaged include, but are not limited to, deactivating device 100, increasing security in device 100 (e.g., moving certain data to storage within memory circuitry 104, encrypting certain data, requiring password authentication, etc.), generating a visible, audible or tactile notification regarding the state of device 100, etc.

Example device 100 illustrated in FIG. 1 comprises two examples demonstrating how the bypass of API monitoring by a hacker, malware, etc. may be prevented. A more comprehensive solution is illustrated in regard to code page 116A, while a solution that may be tailored to target certain sections of code is illustrated in regard to code page 116B. In at least one embodiment, each code page 116A . . . C may comprise an access permission. Examples of access permissions may include read only, read/write, executable and non-executable. When the access permission of code page 116A is set to non-executable, any thread attempting to execute code in code page 116A will generate an exception (e.g., which may be handled by an exception handler in device 100). In an example of operation, thread 110A may access API 118A in code page 116A (e.g., may attempt to execute an API function in API 118A) as shown at 122. The access permission of code page 116A is set to non-executable, which may both stop thread 110A from accessing API 118A and also cause an exception to be generated. As shown at 124, BT circuitry 106 may then handle the exception directly, may be invoked by a separate exception handler that received the exception, etc. BT circuitry 106 may then determine whether the program calls being made by thread 110A are legitimate, and may either execute BT 120A or engage security circuitry 108 based on the determination of legitimacy as shown at 126. In this manner, an attempt to access any code on page 116A will cause API monitoring to be invoked, thwarting various schemes to skip API monitoring that may be devised by attackers.

However, each code page 116A . . . C may comprise multiple code sections, and some code sections may not require API monitoring (e.g., the code sections may not affect an area of device 100 that is vital to the security, may not may API calls, etc.). Thus, in certain circumstances it may be beneficial to employ a more-refined defense so as to avoid overhead due to unnecessary API monitoring. In at least one embodiment, certain sections of an API (e.g., API 118B) may be modified to prevent the bypass of API monitoring while leaving other code that may exist in the code page (e.g., code page 116B) unaffected (e.g., executable). The native code making up API 118B may include, for example, at least API header section 128 and API body section trap 130. API header section 128 and body section 130 may be standard components of program structure for API 118B. In at least one embodiment, some or all of body section 130 in API 118B may be replaced with at least one command to generate an exception. For example, the "int3" command may generate an exception in an x86 processor-based systems. Any exception that is generated by API body trap 126 may be deemed a potential attack (e.g., or at least an attempt to avoid API monitoring). In an example of operation, thread 110C may attempt to bypass API monitoring by skipping header 128 and calling API functions directly in body trap portion 130 as shown at 132. However, since some or all of body section 130 comprises at least one trap instruction, executing body section 130 may generate an exception. BT circuitry 106 may determine whether program calls from thread 110B constitute an attack, and may either execute BT 120A or engage security circuitry 108 as shown at 136. For example, an exception generated upon entry into body API body trap 130 (e.g., due to normal execution) may be analyzed to determine the legitimacy of the program calls. However, exceptions generated from trap instructions executed within API body trap 130 may be deemed attacks because the internal instructions may only be executed when attempting to avoid API monitoring invoked in the initial portion of API 118B. Execution of these internal trap instructions may cause protective measures to be engaged (e.g., by security circuitry 108).

Trapping attackers using API body trap 130 may be utilized alone or in combination with the inclusion of optional intercept jump 136. Consistent with the present disclosure, at least one jump instruction 136 may be inserted following API header section 128 to cause a jump to API monitoring. In an example of normal execution, thread 110B may access API 118B as shown at 138. Executing API header section 128 may be followed by executing jump instruction 136 as shown at 140. Jump instruction 136 may intercept the execution of API 118B and redirect to BT circuitry 106 as shown at 142. Similar to the above, BT circuitry 106 may determine whether program calls being made by thread 110B are legitimate, and may then either execute BT 120A or engage security circuitry 108 based on the determination of legitimacy as shown at 136. The use of intercept jump 136 may be beneficial in that execution may be diverted to BT circuitry 106 without incurring the processing overhead needed to handle the generation of an exception.

The Enhanced Mitigation Experience Toolkit (EMET) from the Microsoft Corporation may comprise Anti-Detour technology. Anti-Detour may also insert at least one jump instruction into the header of the monitored API and may replace several bytes at the top of an API function following the jump instruction with trap instructions (e.g., INT 3). However, EMET does not utilize dynamic BT technology. Protection is limited to the first several instructions following the jump instruction where EMET may utilize known prolog code to emulate the sections of the API function that were replaced with trap instructions. Because protection is limited only to the first several instructions, an attacker may easily bypass the protection by simply jumping further into the API function (e.g., after the trap instructions).

Consistent with the present disclosure, BT technology is used to avoid this vulnerability. No assumptions are made on the instructions used in the API prolog code (e.g., the first several instructions of API entry). Since protection is not limited to the prolog (e.g., trap instructions may be inserted into the body section of the native code or may fully replace the entire body section of the native code), any API function may be secured and protection is enabled for the entire API code section. Moreover, BT technology may find the entire body of the API function dynamically, decode and analyze the instruction stream from the API function entry, follow the target of the branch instruction and performing control analysis to find even disjointed code sections, precisely locate the entire API code sections, etc. This may allow precise identification and replacement the entire API function body with trap instructions, making it impossible to circumvent protection. BT technology also allows for the dynamic creation and execution of semantically and functionally equivalent translations of the entire native code for any original instructions while allowing the original native code to be protected from API hook bypass attack.

FIG. 2 illustrates an example configuration for a system usable in accordance with at least one embodiment of the present disclosure. The inclusion of an apostrophe after an item number (e.g., 100') in the present disclosure may indicate that an example embodiment of the particular item is being illustrated. For example, device 100' may be capable of performing any or all of the activities disclosed in FIG. 1. However, device 100' is presented only as an example of an apparatus usable in embodiments consistent with the present disclosure, and is not intended to limit any of the embodiments disclosed herein to any particular manner of implementation.

System circuitry 200 may manage the operation of device 100'. System circuitry 200 may comprise, for example, processing circuitry 102', memory circuitry 104', power circuitry 202, user interface circuitry 204 and communication interface circuitry 206. Device 100' may further include communication circuitry 208. While communication circuitry 214 is illustrated as separate from system circuitry 200, device 100' is provided in FIG. 2 merely for the sake of explanation in regard to various embodiments. Variations are possible including, for example, some or all of the functionality of communication circuitry 208 being incorporated into system circuitry 200.

In device 100', processing circuitry 102' may comprise one or more processors situated in separate components, or alternatively one or more processing cores in a single component (e.g., in a System-on-a-Chip (SoC) configuration), along with processor-related support circuitry (e.g., bridging interfaces, etc.). Example processors may include, but are not limited to, various x86-based microprocessors available from the Intel Corporation including those in the Pentium, Xeon, Itanium, Celeron, Atom, Quark, Core i-series, Core M-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) to provide an interface through which processing circuitry 102' may interact with other system components that may be operating at different speeds, on different buses, etc. in device 100'. Moreover, some or all of the functionality commonly associated with the support circuitry may also be included in the same physical package as the processor (e.g., such as in the Sandy Bridge family of processors available from the Intel Corporation).

Processing circuitry 102' may be configured to execute various instructions in device 100'. Instructions may include program code configured to cause processing circuitry 204 to perform activities related to reading data, writing data, processing data, formulating data, converting data, transforming data, etc. Information (e.g., instructions, data, etc.) may be stored in memory circuitry 104'. Memory circuitry 104' may comprise random access memory (RAM) and/or read-only memory (ROM) in a fixed or removable format. RAM may include volatile memory configured to hold information during the operation of device 100' such as, for example, static RAM (SRAM) or Dynamic RAM (DRAM). ROM may include non-volatile (NV) memory circuitry configured based on BIOS, UEFI, etc. to provide instructions when device 100' is activated, programmable memories such as electronic programmable ROMs (EPROMS), Flash, etc. Other examples of fixed/removable memory may include, but are not limited to, magnetic memories such as hard disk (HD) drives, electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power circuitry 202 may include, for example, internal power sources (e.g., a battery, fuel cell, etc.) and/or external power sources (e.g., electromechanical or solar generator, power grid, external fuel cell, etc.), and related circuitry configured to supply device 100' with the power needed to operate. User interface circuitry 204 may include hardware and/or software to allow users to interact with device 100' such as, for example, various input mechanisms (e.g., microphones, switches, buttons, knobs, keyboards, speakers, touch-sensitive surfaces, one or more sensors configured to capture images, video and/or sense proximity, distance, motion, gestures, orientation, biometric data, etc.) and various output mechanisms (e.g., speakers, displays, lighted/flashing indicators, electromechanical components for vibration, motion, etc.). The hardware in user interface circuitry 204 may be incorporated within device 100' and/or may be coupled to device 100' via a wired or wireless communication medium. At least some user interface circuitry 204 may be optional in certain circumstances such as, for example, a situation wherein device 100' is a very space-limited form factor device, a server (e.g., rack server, blade server, etc.), etc. that does not include user interface circuitry 204, and instead relies on another device (e.g., a management terminal) for user interface functionality.

Communication interface circuitry 206 may be configured to manage packet routing and other control functions for communication circuitry 208, which may include resources configured to support wired and/or wireless communications. In some instances, device 100' may comprise more than one set of communication circuitry 208 (e.g., including separate physical interface circuitry for wired protocols and/or wireless radios) managed by centralized communication interface circuitry 206. Wired communications may include serial and parallel wired mediums such as, for example, Ethernet, USB, Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth, WLAN, Wi-Fi, etc.), long range wireless mediums (e.g., cellular wide-area radio communication technology, satellite-based communications, etc.), electronic communications via sound waves, etc. In one embodiment, communication interface circuitry 206 may be configured to prevent wireless communications that are active in communication circuitry 208 from interfering with each other. In performing this function, communication interface circuitry 206 may schedule activities for communication circuitry 208 based on, for example, the relative priority of messages awaiting transmission. While FIG. 2 illustrates communication interface circuitry 206 and communication circuitry 208 as separate, it may also be possible for the functionality of communication interface circuitry 206 and communication circuitry 208 to be combined in the same circuitry.

Consistent with the present disclosure, threads 110A . . . C' may be executed in processing circuitry 102'. While BT circuitry 106' and security circuitry 108' may be implemented totally in circuitry (e.g., as shown in FIG. 1), it may also be possible for some or all of BT circuitry 106' and/or security circuitry 108' to be implemented via software. For example, program code, data, etc. in memory circuitry 104' may be executed by processing circuitry 102' to transform processing circuitry 102' from general data processing circuitry into specialized circuitry that is configured to at least perform the operations associated with BT circuitry 106' and security circuitry 108'. Moreover, as described in regarding to FIG. 1, code memory 112' and BT cache 114' may also reside in memory circuitry 104'. As a result, processing circuitry 102' may interact with at least memory circuitry 104' to perform some or all of the operations described in regard to FIG. 1.

Figure 3:
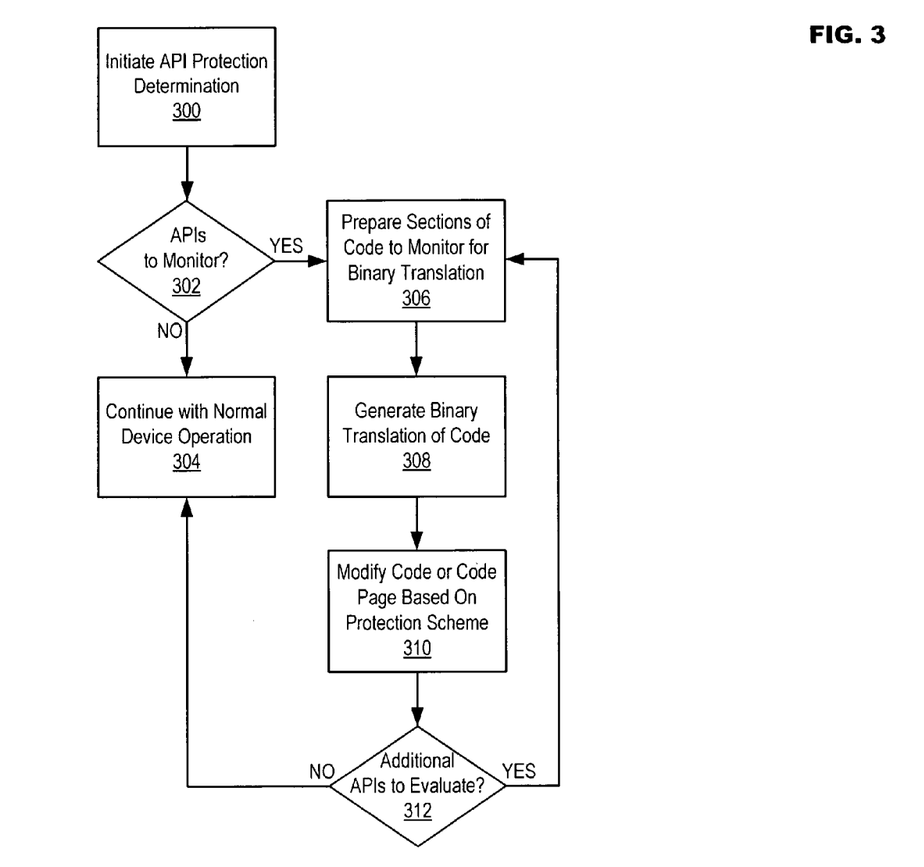
FIG. 3 illustrates example operations for preparing at least one API for monitoring in accordance with at least one embodiment of the present disclosure.

FIG. 3 illustrates example operations for preparing at least one API for monitoring in accordance with at least one embodiment of the present disclosure. In operation 300 an API protection determination may be initiated. API protection determination may involve at least determining which APIs to monitor in a device. The API protection determination may be initiated, for example, when device 100 is initialized (e.g., powered up, rebooted, etc.) by an application loaded in device 100 automatically or through user interaction, etc. In operation 302 a determination may be made as to whether there are any APIs to monitor. If in operation 302 it is determined that there are no APIs to monitor, then in operation 304 the device may continue with normal operation.

If in operation 302 it is determined that there are APIs to monitor, then in operation 306 sections of code that will be monitored may be prepared for binary translation. Operation 306 may include, for example, performing a control flow analysis of the API code sections and then "forming a region" of each API code section to be monitored. In the instance of x86 processor-based devices, forming a region may include determining a set of x86 instructions for the target API code section prior to generating a BT. A BT of API code sections to be monitored may then be generated in operation 308. In operation 310 the API code section to be monitored, or the code page on which the API code section resides, may be modified based on the particular protection scheme being employed. For example, if page-level protection is being utilized, then the access permission may be changed to non-executable for code pages comprising API code sections to be monitored. Alternatively, the code sections themselves may be modified to add an intercept jump after the header and/or to modify some or all of the body section of the code section to include at least one trap instruction. A determination may then be made in operation 312 as to whether there are additional API sections to evaluate for monitoring. A determination that there are additional API sections to evaluate may be followed by a return to operation 306 to prepare further API sections before translation. A determination that there are no further APIs to evaluate may be followed by a return to operation 304 to continue with normal device operation.

Figure 4:
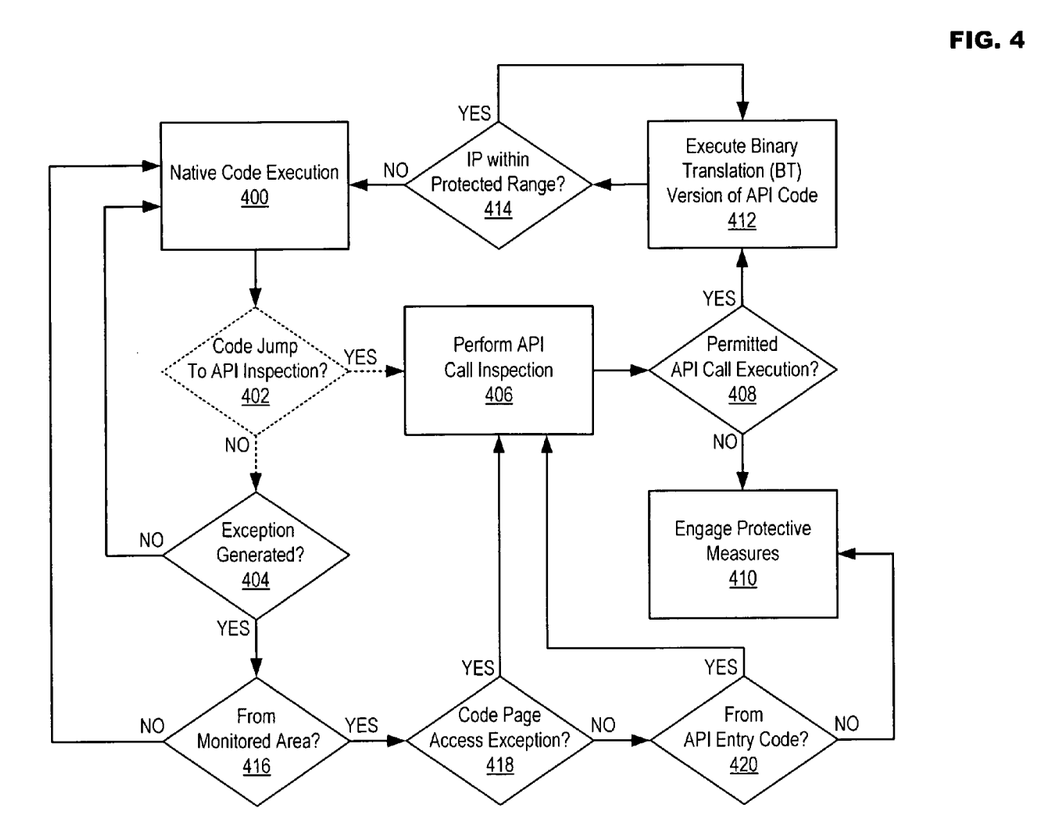
FIG. 4 illustrates example operations for monitoring at least one API in accordance with at least one embodiment of the present disclosure.

FIG. 4 illustrates example operations for monitoring at least one API in accordance with at least one embodiment of the present disclosure. In operation 400 native code may be executed making at least one API function call. An optional determination may then be made in operation 402 as to whether a code jump has been made directly to API inspection (e.g., via intercept jump 124) or whether an exception was generated in operation 404. Operation 402 may be optional in that, for example, the operation may only be applicable if at least one code jump instruction was inserted following the header section in the native code (e.g., in operation 310 of FIG. 3). If the code jump instruction is not being employed in a particular implementation, then operation 402 would be unnecessary. Regardless, if in optional operation 402 and operation 404 no intercept jump or exception is detected, then native code execution may continue in operation 400.

If in operation 402 a code jump is determined to have occurred, then in operation 406 API call inspection may be performed. API call inspection may comprise determining if at least one program call made as a result of execution of the native code is legitimate. A determination may then be made in operation 408 as to whether the API program call made during execution of the native code is permitted (e.g., legitimate API program call). If in operation 408 the program call is determined to be illegitimate (e.g., attributable to a possible attack on the device), then in operation 410 protective measures may be engaged. Example protective measures may include deactivating the device, increasing device security, generating a notification, etc. If in operation 408 it is determined that the API program call is permitted (e.g., legitimate), then in operation 412 a BT version of the API code may be executed. A determination may then be made in operation 414 as to whether instruction pointers (IP) in the executed code point to other code within the protected range (e.g., within the BT). If in operation 414 it is determined that the IPs point to locations within the protected range, then execution may continue in operation 412. A determination in operation 414 that at least one IP points to a location external to the protected range may be followed by a return to operation 400 to continue executing the native code.

If no code jump is employed, but in operation 404 a determination is made that an exception has been generated, then in operation 416 a further determination may be made as to whether the exception was generated from a monitored area. A variety of events may cause an exception to be generated, and not all may originate in the monitored API regions. Thus, if it is determined in operation 416 that the exception did not originate from a monitored area then the execution of the native code may continue in operation 400. If in operation 416 it is determined that the exception did originate in the native code, then a further determination may be made in operation 418 as to whether the exception was a code page access exception (e.g., generated by the native code attempting to execute an API function in a code page with access permission set to non-executable). A determination that the exception is a code page access exception may be followed by a return to operation 406 to perform API call inspection. If in operation 418 it is determined that the exception is not a code page access exception, then in operation 420 a further determination may be made as to whether the access exception originated from API entry code. An exception generated by code entry into the body section of the native code may be considered normal operation, and API call inspection may then be performed. An exception generated from execution of at least one trap instruction within the body section may be deemed an attack in that normal entry into the native code has been circumvented to, for example, avoid API monitoring. A determination in operation 420 that the exception was generated by the API entry code may be followed by a return to operation 406 to perform API call inspection. Alternatively, a determination in operation 420 that the exception was not generated by API entry code (e.g., that the exception was generated by a trap instruction within the body section of the native code) may be followed by a return to operation 410 to engage protective measures to prevent the device from being compromised.

While FIGS. 3 and 4 illustrate operations according to different embodiments, it is to be understood that not all of the operations depicted in FIGS. 3 and 4 are necessary for other embodiments. Indeed, it is fully contemplated herein that in other embodiments of the present disclosure, the operations depicted in FIGS. 3 and 4, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores to execute program code that transforms a computer processor from general data processing equipment into circuitry configured to perform one or more specific functions, state machine circuitry, and/or firmware that stores instructions executed by programmable circuitry. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software circuitry executed by a programmable control device.

Thus, this disclosure is directed to a system for system for application program interface (API) monitoring bypass prevention. Operation of an API function may be preserved by generating a binary translation based on the API function native code. The native code may then be protected to prevent API monitoring bypassing. In one embodiment, access permission may be set to non-executable for a memory page in which the native code is stored. Attempts to execute the native code may generate exceptions triggering API monitoring. Alternatively, some or all of a body section of the native code may be replaced with at least one trap instruction that cause exceptions triggering API monitoring or engaging protective measures. Use of the trap instruction may be combined with at least one jump instruction added after a header section of the native code. Execution of the jump instruction may cause execution to be redirected to API monitoring.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for API monitoring bypass prevention.

According to example 1 there is provided a device equipped with application program interface (API) monitoring bypass prevention. The device comprising processing circuitry to execute at least one thread, memory circuitry to store native code and a binary translation corresponding to the native code and binary translation circuitry to generate the binary translation based on the native code, protect the native code to prevent a bypass of API monitoring and perform API monitoring.

Example 2 may include the elements of example 1, wherein in generating the binary translation the binary translation circuitry is to determine at least one section of the native code for API monitoring and prepare the at least one section of the native code for binary translation generation.

Example 3 may include the elements of any of examples 1 to 2, wherein in protecting the native code the binary translation circuitry is to alter an access permission of at least one code page in the memory circuitry in which the native code is stored.

Example 4 may include the elements of example 3, wherein the binary translation circuitry is to set the access permission of the at least one code page to non-executable.

Example 5 may include the elements of example 4, wherein in performing API monitoring the binary translation circuitry is to inspect a program call made by the at least one thread when an exception is generated by the at least one thread attempting to execute the native code in the at least one non-executable code page.

Example 6 may include the elements of any of examples 1 to 5, wherein the native code comprises at least a body section and in protecting the native code the binary translation circuitry is to replace at least a portion of the body section with at least one trap instruction to trigger an exception.

Example 7 may include the elements of example 6, wherein at least one the trap instruction is an int3 command.

Example 8 may include the elements of any of examples 6 to 7, and may further comprise security circuitry and wherein in performing API monitoring the binary translation circuitry is to redirect code execution to API monitoring when an exception is generated by the at least one thread executing a trap instruction upon entry into the body section and cause the security circuitry to engage protective measures when an exception is generated by the at least one thread executing a trap instruction from within the body section.

Example 9 may include the elements of any of examples 6 to 8, wherein the native code further comprises at least a header section and in protecting the native code the binary translation circuitry is to insert into the native code following the header section at least one jump instruction to redirect code execution to API monitoring.

Example 10 may include the elements of example 9, wherein in performing API monitoring the binary translation circuitry is to inspect at least one program call made by the at least one thread when an exception is generated by the at least one thread executing the at least one jump instruction.

Example 11 may include the elements of any of examples 1 to 10, wherein in performing API monitoring the binary translation circuitry is to inspect at least one program call made by the at least one thread and execute the binary translation of the native code based on the at least one program call passing the inspection.

Example 12 may include the elements of example 11, and may further comprise security circuitry and wherein the binary translation circuitry is to cause the security circuitry to engage protective measures based on the at least one program call not passing the inspection.

Example 13 may include the elements of example 12, wherein the protective measures comprise at least one of deactivating the device, increasing security in the device or generating a notification.

Example 14 may include the elements of any of examples 1 to 13, wherein in protecting the native code the binary translation circuitry is to set the access permission of the at least one code page to non-executable and in performing API monitoring the binary translation circuitry is to inspect a program call made by the at least one thread when an exception is generated by the at least one thread attempting to execute the native code in the at least one non-executable code page.

According to example 15 there is provided a method for application program interface (API) monitoring bypass prevention. The method may comprise determining at least one section of native code to be subjected to API monitoring in a device, wherein the native code is stored in memory circuitry within the device, preparing the at least one section of native code for binary translation, generating a binary translation of the at least one section of the native code, storing the binary translation in at least one translation page in the memory circuitry, protecting the native code to prevent a bypass of API monitoring and performing API monitoring.

Example 16 may include the elements of example 15, wherein protecting the native code comprises setting an access permission to non-executable for at least one code page in the memory circuitry in which the native code is stored.

Example 17 may include the elements of example 16, wherein performing API monitoring comprises inspecting a program call made by at least one thread executed by processing circuitry in the device when an exception is generated by the at least one thread attempting to execute the native code in the at least one non-executable code page.

Example 18 may include the elements of any of examples 15 to 17, wherein the native code comprises at least a body section and protecting the native code comprises replacing at least a portion of the body section with at least one trap instruction to trigger an exception.

Example 19 may include the elements of example 18, wherein the native code further comprises at least a header section and protecting the native code comprises inserting at least one jump instruction into the native code following the header section to redirect code execution to API monitoring.

Example 20 may include the elements of example 19, wherein performing API monitoring comprises at least one of inspecting at least one program call made by the at least one thread when an exception is generated by the at least one thread executing a trap instruction upon entry into the body section, engaging protective measures when an exception is generated by the at least one thread executing a trap instruction from within the body section or inspecting at least one program call made by the at least one thread when an exception is generated by the at least one thread executing the at least one jump instruction.

Example 21 may include the elements of any of examples 15 to 20, wherein performing API monitoring comprises inspecting at least one program call made by the at least one thread, executing the binary translation of the native code based on the at least one program call passing the inspection and engaging protective measures based on the at least one program call not passing the inspection.

Example 22 may include the elements of example 21, wherein engaging protective measures comprises at least one of deactivating the device, increasing security in the device or generating a notification.

Example 23 may include the elements of any of examples 15 to 22, wherein protecting the native code comprises setting an access permission to non-executable for at least one code page in the memory circuitry in which the native code is stored and performing API monitoring comprises inspecting a program call made by at least one thread executed by processing circuitry in the device when an exception is generated by the at least one thread attempting to execute the native code in the at least one non-executable code page.

Example 24 may include the elements of any of examples 15 to 23, wherein the native code comprises at least a body section and a header section and protecting the native code comprises at least one of replacing at least a portion of the body section with at least one trap instruction to trigger an exception and inserting at least one jump instruction into the native code following the header section to redirect code execution to API monitoring.

According to example 25 there is provided a system including at least a device, the system being arranged to perform the method of any of the above examples 15 to 24.

According to example 26 there is provided a chipset arranged to perform the method of any of the above examples 15 to 24.

According to example 27 there is provided at least one machine readable medium comprising a plurality of instructions that, in response to be being executed on a computing device, cause the computing device to carry out the method according to any of the above examples 15 to 24.

According to example 28 there is provided a device configured for application program interface (API) monitoring bypass prevention, the device being arranged to perform the method of any of the above examples 15 to 24.

According to example 29 there is provided a system for application program interface (API) monitoring bypass prevention. The system may comprise means for determining at least one section of native code to be subjected to API monitoring in a device, wherein the native code is stored in memory circuitry within the device, means for preparing the at least one section of native code for binary translation, means for generating a binary translation of the at least one section of the native code, means for storing the binary translation in at least one translation page in the memory circuitry, means for protecting the native code to prevent a bypass of API monitoring and means for performing API monitoring.

Example 30 may include the elements of example 29, wherein the means for protecting the native code comprise means for setting an access permission to non-executable for at least one code page in the memory circuitry in which the native code is stored.

Example 31 may include the elements of example 30, wherein the means for performing API monitoring comprise means for inspecting a program call made by at least one thread executed by processing circuitry in the device when an exception is generated by the at least one thread attempting to execute the native code in the at least one non-executable code page.

Example 32 may include the elements of any of examples 29 to 31, wherein the native code comprises at least a body section and the means for protecting the native code comprise means for replacing at least a portion of the body section with at least one trap instruction to trigger an exception.

Example 33 may include the elements of example 32, wherein the native code further comprises at least a header section and the means for protecting the native code comprise means for inserting at least one jump instruction into the native code following the header section to redirect code execution to API monitoring.

Example 34 may include the elements of example 33, wherein the means for performing API monitoring comprise at least one of means for inspecting at least one program call made by the at least one thread, means for executing the binary translation of the native code based on the at least one program call passing the inspection or means for engaging protective measures based on the at least one program call not passing the inspection.

Example 35 may include the elements of any of examples 29 to 34, wherein the means for performing API monitoring comprise means for inspecting at least one program call made by the at least one thread, means for executing the binary translation of the native code based on the at least one program call passing the inspection and means for engaging protective measures based on the at least one program call not passing the inspection.

Example 36 may include the elements of example 35, wherein the means for engaging protective measures comprise means for at least one of deactivating the device, increasing security in the device or generating a notification.

Example 37 may include the elements of any of examples 29 to 36, wherein the means for protecting the native code comprise means for setting an access permission to non-executable for at least one code page in the memory circuitry in which the native code is stored, and the means for performing API monitoring comprise means for inspecting a program call made by at least one thread executed by processing circuitry in the device when an exception is generated by the at least one thread attempting to execute the native code in the at least one non-executable code page.

Example 38 may include the elements of any of examples 29 to 37, wherein the native code comprises at least a body section and a header section and the means for protecting the native code comprise means for at least one of replacing at least a portion of the body section with at least one trap instruction to trigger an exception and inserting at least one jump instruction into the native code following the header section to redirect code execution to API monitoring.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device equipped with application program interface (API) monitoring bypass prevention, comprising:
   processing circuitry to execute at least one thread;
   memory circuitry to store native code and a binary translation corresponding to the native code; and
   binary translation circuitry to:
      determine if at least one API in the native code is to be monitored;
      when it is determined that at least one API in the native code is to be monitored:
         generate the binary translation based on the native code corresponding to the at least one API to be monitored;
         determine whether to implement a page level protection scheme to monitor the at least one API by modifying at least one access permission;
         determine whether to implement a code section protection scheme to monitor the at least one API by modifying or adding at least one code section in the binary translation; and
         perform API monitoring based on the implemented protection scheme.

2. The device of claim 1, wherein in generating the binary translation the binary translation circuitry is to determine at least one section of the native code for API monitoring and prepare the at least one section of the native code for binary translation generation.

3. The device of claim 1, wherein in protecting the native code the binary translation circuitry is to alter an access permission of at least one code page in the memory circuitry in which the native code is stored.

4. The device of claim 3, wherein the binary translation circuitry is to set the access permission of the at least one code page to non-executable.

5. The device of claim 4, wherein in performing API monitoring the binary translation circuitry is to inspect a program call made by the at least one thread when an exception is generated by the at least one thread attempting to execute the native code in the at least one non-executable code page.

6. The device of claim 1, wherein the native code comprises at least a body section and in protecting the native code the binary translation circuitry is to replace at least a portion of the body section with at least one trap instruction to trigger an exception.

7. The device of claim 6, further comprising security circuitry and wherein in performing API monitoring the binary translation circuitry is to redirect code execution to API monitoring when an exception is generated by the at least one thread executing a trap instruction upon entry into the body section and cause the security circuitry to engage protective measures when an exception is generated by the at least one thread executing a trap instruction from within the body section.

8. The device of claim 6, wherein the native code further comprises at least a header section and in protecting the native code the binary translation circuitry is to insert into the native code following the header section at least one jump instruction to redirect code execution to API monitoring.

9. The device of claim 8, wherein in performing API monitoring the binary translation circuitry is to inspect at least one program call made by the at least one thread when an exception is generated by the at least one thread executing the at least one jump instruction.

10. The device of claim 1, wherein in performing API monitoring the binary translation circuitry is to inspect at least one program call made by the at least one thread and execute the binary translation of the native code based on the at least one program call passing the inspection.

11. The device of claim 10, further comprising security circuitry and wherein the binary translation circuitry is to cause the security circuitry to engage protective measures based on the at least one program call not passing the inspection.

12. A method for application program interface (API) monitoring bypass prevention, comprising:
  determining at least one section of native code to be subjected to API monitoring in a device, wherein the native code is stored in memory circuitry within the device;
  preparing the at least one section of native code for binary translation;
  generating a binary translation of the at least one section of the native code;
  storing the binary translation in at least one translation page in the memory circuitry;
  determining whether to implement a page level protection scheme to monitor the at least one API by modifying at least one access permission;
  determining whether to implement a code section protection scheme to monitor the at least one API by modifying or adding at least one code section in the binary translation; and
  performing API monitoring based on the implemented protection scheme.

13. The method of claim 12, wherein protecting the native code comprises setting an access permission to non-executable for at least one code page in the memory circuitry in which the native code is stored.

14. The method of claim 13, wherein performing API monitoring comprises inspecting a program call made by at least one thread executed by processing circuitry in the device when an exception is generated by the at least one thread attempting to execute the native code in the at least one non-executable code page.

15. The method of claim 12, wherein the native code comprises at least a body section and protecting the native code comprises replacing at least a portion of the body section with at least one trap instruction to trigger an exception.

16. The method of claim 15, wherein the native code further comprises at least a header section and protecting the native code comprises inserting at least one jump instruction into the native code following the header section to redirect code execution to API monitoring.

17. The method of claim 16, wherein performing API monitoring comprises at least one of:
  inspecting at least one program call made by the at least one thread when an exception is generated by the at least one thread executing a trap instruction upon entry into the body section;
  engaging protective measures when an exception is generated by the at least one thread executing a trap instruction from within the body section; or
  inspecting at least one program call made by the at least one thread when an exception is generated by the at least one thread executing the at least one jump instruction.

18. The method of claim 12, wherein performing API monitoring comprises:
  inspecting at least one program call made by the at least one thread;
  executing the binary translation of the native code based on the at least one program call passing the inspection; and
  engaging protective measures based on the at least one program call not passing the inspection.

19. At least one machine-readable storage medium having stored thereon, individually or in combination, instructions for application program interface (API) monitoring bypass prevention that, when executed by one or more processors, cause the one or more processors to:
  determine at least one section of native code to be subjected to API monitoring in a device, wherein the native code is stored in memory circuitry within the device;
  prepare the at least one section of native code for binary translation;
  generate a binary translation of the at least one section of the native code;
  store the binary translation in at least one translation page in the memory circuitry;
  determine whether to implement a page level protection scheme to monitor the at least one API by modifying at least one access permission;

determine whether to implement a code section protection scheme to monitor the at least one API by modifying or adding at least one code section in the binary translation; and perform API monitoring based on the implemented protection scheme.

20. The storage medium of claim 19, wherein the instructions to protect the native code comprise instructions to set an access permission to non-executable for at least one code page in the memory circuitry in which the native code is stored.

21. The storage medium of claim 20, wherein the instructions to perform API monitoring comprise instructions to inspect a program call made by at least one thread executed by processing circuitry in the device when an exception is generated by the at least one thread attempting to execute the native code in the at least one non-executable code page.

22. The storage medium of claim 19, wherein the native code comprises at least a body section and the instructions to protect the native code comprise instructions to replace at least a portion of the body section with at least one trap instruction to trigger an exception.

23. The storage medium of claim 22, wherein the native code further comprises at least a header section and the instructions to protect the native code comprise instructions to insert at least one jump instruction into the native code following the header section to redirect code execution to API monitoring.

24. The storage medium of claim 23, wherein the instructions to perform API monitoring comprise instructions to at least one of:

inspecting at least one program call made by the at least one thread;

executing the binary translation of the native code based on the at least one program call passing the inspection; or engaging protective measures based on the at least one program call not passing the inspection.

25. The storage medium of claim 19, wherein the instructions to perform API monitoring comprise instructions to:

inspect at least one program call made by the at least one thread;

execute the binary translation of the native code based on the at least one program call passing the inspection; and engage protective measures based on the at least one program call not passing the inspection.

* * * * *